May 9, 1961    W. H. VERWERS    2,983,413
CARGO SECURING DEVICE
Filed July 10, 1957
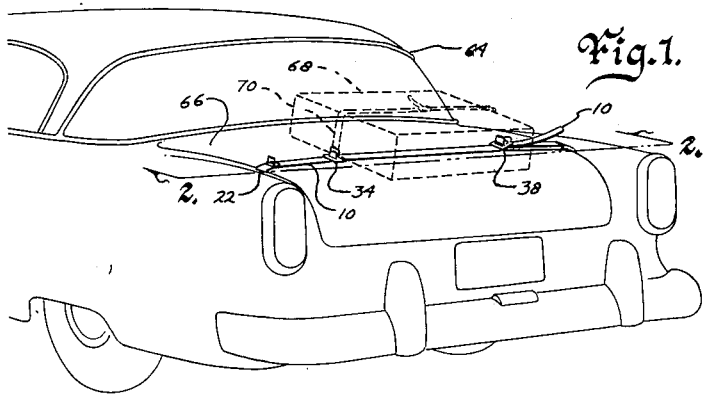
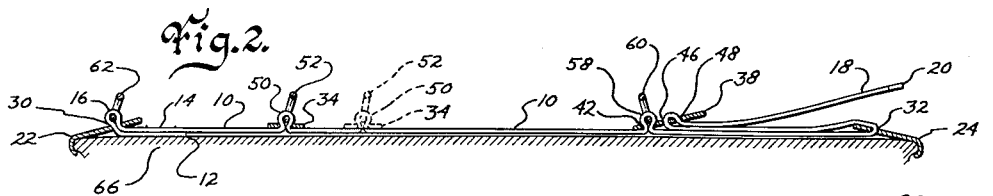
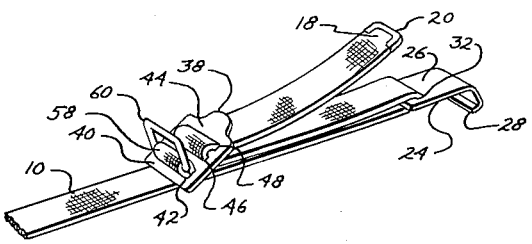
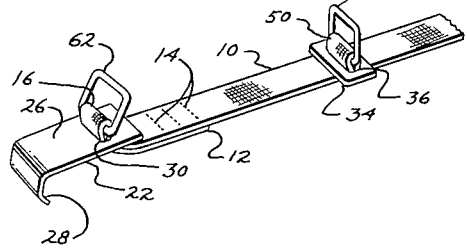
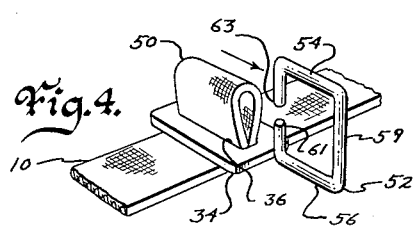
Inventor
William H. Verwers
by Donald H. Zarley
Attorney
Witness
Edward P. Seeley

United States Patent Office 2,983,413
Patented May 9, 1961

2,983,413

CARGO SECURING DEVICE

William H. Verwers, 606 E. Madison, Des Moines, Iowa

Filed July 10, 1957, Ser. No. 670,986

1 Claim. (Cl. 224—42.1)

My invention relates to cargo securing devices and more particularly to a device which will permit the securing of a cargo to various parts of a motor vehicle.

Most people, at one time or another, have occasion to transport commodities from one place to another. These commodities often cannot be carried by hand because of their weight or the distance involved in the trip. Very few people have a truck-type vehicle to accomplish the moving of the article, and the passenger automobile is thereupon employed to provide the necessary transportation. Many times, the article must be placed on the outside of the automobile and it is to this type of situation that my invention pertains.

Some devices known to me have been designed to facilitate the securing of a load to the outside of an automobile. However, these devices known to me can only be adapted for use on the top of the automobile, but many loads are not best suited to this position. Furthermore, these devices known to me can secure only certain types of articles to the automobile top and then only articles of limited size can be so secured.

Therefore, it is the principal object of my invention to provide a cargo securing device that can be adapted for use on different parts of a conventional automobile or truck.

A further object of my invention is to provide a cargo securing device that is adapted to secure various type loads to an automobile or truck.

A still further object of my invention is to provide a cargo securing device that will permit loads of various sizes to be easily secured to an automobile or truck.

A still further object of my invention is to provide a cargo securing device that can secure a given load to an automobile or truck without marring the surface of the automobile or truck.

A still further object of my invention is to provide a cargo securing device that can be easily removed from its position upon an automobile or truck.

A still further object of my invention is to provide a cargo securing device that is durable in use, economical of manufacture and refined in appearance.

These and other objects will be apparent to those skilled in the art.

My invention consists in the construction, arrangements, and combination, of the various parts of the device, whereby the objects contemplated are attained as hereinafter more fully set forth, specifically pointed out in my claim, and illustrated in the accompanying drawings, in which:

Fig. 1 is a perspective view of my device mounted on the trunk lid of a conventional automobile. The dotted lines in this figure depict the position of a box that is secured to the trunk lid by my device, Fig. 2 is a sectional view of my device taken on line 2—2 of Fig. 2, Fig. 3 is a perspective view of my device, and Fig. 4 is a partial perspective view of my device showing the details of my detachable anchor element.

I have used the numeral 10 to generally designate an elongated belt element which can be made of nylon or any conventional webbing material. The end 12 of belt 10 is doubled back upon the belt and sewn at 14 to form loop 16. The other end 18 of belt 10 can have conventional clasp member 20 secured thereon in any conventional manner.

I will now describe the two hook elements 22 and 24 which are operatively secured to belt 10, and will be discussed hereafter. Each of the hook elements 22 and 24 are comprised generally of flat portion 26 and a bent hook portion 28. Slot openings 30 and 32 are located in the hook elements 22 and 24, respectively, and are positioned substantially parallel to the bent hook portions 28. The slot openings 30 and 32 preferably have a width substantially equal to a double thickness of belt 10.

An anchor element 34 having a slot opening 36 can be operatively secured to belt 10, as will be discussed hereafter. The slot opening 36 is similar to the slot openings 30 and 32 in hook elements 22 and 24, respectively, in that slot 36 is also substantially equal in width to a double thickness of belt 10.

A buckle 38 can be operatively secured to belt 10, as will be discussed hereafter. The rear portion 40 of buckle 38 is substantially identical to anchor element 34 in that rear portion 40 has a slot opening 42 that is substantially equal in width to a double thickness of belt 10. The forward portion 44 of buckle 40 has slot openings 46 and 48 which can receive at least a single thickness of belt 10 and which are disposed in a position parallel to that of slot opening 42.

Fig. 4 shows how a loop 50 can be formed at any point along belt 10 and then be inserted up through the slot opening 36 in anchor element 34. The loop 50 is shown in Fig. 4 to extend through slot opening 36 a great enough distance to receive rectangular split ring 52. Split ring 52 is comprised of side portions 54 and 56, top portion 59, and end portions 61 and 63. End portions 61 and 63 are spaced apart a distance at least as great as the thickness of belt 10. Side portions 54 and 56 are spaced apart a distance at least as great as the width of belt 10. The relation of split ring 52 with respect to belt loop 50 will be discussed hereafter. In this regard, it should be noted that the slot opening 42 in buckle 38 is capable of receiving a belt loop 58 just as anchor 34 was capable of receiving belt loop 50. Figs. 2 and 3 show split rings 60 and 62 associated with belt loops 58 and 16, respectively, and it is understood that the identity of these split rings and their relation to their respective belt loop is the same as split ring 52 and its relation to belt loop 50.

Fig. 1 shows a conventional automobile 64 having a trunk lid 66 with the above described elements assembled, as described hereafter, and secured thereto. The dotted lines in Fig. 1 depict how a box 68 could be operatively secured to the trunk lid 66 by my device and auxiliary strap 70.

Having described the structure of my device, I will now describe its normal operation. The anchor element 34 will be described as being first placed upon belt 10, but its mounting on the belt could just as well fall later in sequence. The loop 50 can be formed at any point along the length of belt 10 and is then inserted upwardly through the slot opening 36 in anchor 34. Split ring 52 is positioned, as shown in Fig. 4 and the top of loop 50 is then passed through the spaced apart end portions 61 and 63 into the interior of the split ring. The split ring 52 is then rotated about the top of loop portion 50 so that the end portions 61 and 63 of the ring dwell inside the loop. If the anchor element 34 is not in the desired position on belt 10, the belt 10 can be threaded up and then down through slot opening 36 until the desired position of the anchor element, with respect to the belt, has been attained. It should be noted that the above described threading of belt 10 through slot opening 36 must be accomplished only by keeping that portion of the belt shown as the top of loop 50 up and away from the anchor element 34. When the top of loop 50 is pulled downwardly into tight engagement with the end portions 61 and 63 of ring 52 to bind the end portions between the loop 50 and anchor element 34, it is impossible to have any relative movement between the anchor element and the belt. This is because the restricted width of the slot opening 36 in the anchor element 34 creates a binding effect upon the belt 10, as aptly shown in Fig. 2. Thus, when the loop 50 is pulled down tightly over the end portions 61 and 63 of split ring 52, the anchor element 34 cannot be moved with respect to the belt 10. The movement of the belt 10 with respect to anchor element 34 can be effected only by loosening loop 50, as shown in Fig. 4, and threading the belt through the slot opening 36, as described above. The anchor element 34 can be removed from belt 10 by loosening loop 50 and reversing the above described steps whereby ring 52 was mounted within the loop.

Buckle 38 can be mounted on belt 10 in the same manner as was anchor element 34 by utilizing belt loop 58, slot opening 42 and split ring 60. Hook element 22 can be secured to end 12 of belt 10 in any convenient manner, but I prefer to insert belt loop 16 through slot opening 30 and then mount split ring 62 within loop 16 in the same manner that split ring 52 was mounted within belt loop 50.

The free end 18 of belt 10 can then be inserted through the slot opening 32 in hook element 24, thence through slot openings 46 and 48 in buckle 38, as shown in Figs. 2 and 3. The slot openings 46 and 48 perform the conventional function of preventing the free end 18 of belt 10 from slipping through the buckle 38.

Having so assembled my device, I can place hook members 22 and 24 on the edges of trunk lid 66, as shown in Figs. 1 and 2. The hook elements 22 and 24 could just as easily have been placed on the top and bottom edges of an automobile door, on the edges of the hood portion of an automobile, on the drain troughs along the sides of an automobile top, as done in conventional fashion, or in many other possible positions. The end 18 of belt 10 can then be removed from slot opening 48 in buckle 38 and the slack can then be conventionally taken up in the portion of belt 10 between buckle 38 and hook element 24. If the belt 10 is still loosely secured on the trunk lid 66, the belt loop 58 can be loosened and the buckle 38 can be moved, as described above, in a direction towards hook element 22, to shorten the effective length of the belt. Thus, it is seen that the belt 10 can be made to span any distance which falls within its total length. Anchor element 34 can be similarly moved along belt 10 to any desired position by loosening belt loop 50, and can thereupon be rigidly secured to the belt by the subsequent tightening of the loop. More than one anchor element 34 may obviously be utilized if desired.

The box 68, or any other article can then be secured to the automobile 64 by tying strap 70 to any two or more of the split rings 52, 60 or 62. The split ring 62 is so located only for convenience and the split ring 60 on buckle 38 actually does not need to be directly secured to the load to function properly. However, if split rings 62 and 60 are not utilized to tie down the box 68, at least two anchor elements 34 should probably be mounted on belt 10 to be used for that purpose.

Thus it is seen that my invention accomplishes at least its stated objectives.

Some changes may be made in the construction and arrangement of my cargo securing device without departing from the real spirit and purpose of my invention, and it is my intention to cover by my claim, any modified forms of structure or use of mechanical equivalents which may be reasonably included within its scope.

I claim:

In a cargo securing device, an elongated belt, means on said belt to secure it to the outer surface of a vehicle at times in an elongated extended position, means on said belt for exerting tension on said belt at times, at least one anchor means on said belt, said anchor means having a narrow slot therein, a loop of said belt extending through said slot, the slot in said anchor means having a width substantially equal to that of a double thickness of said belt so as to hold the portions of said belt adjacent said loop together at a point where these portions begin to extend away from each other, and a ring means extending through said loop, said loop tightly closing on said ring when tension is exerted on said belt, said ring means being of sufficient size to prevent the passage of said ring and said loop through the slot in said anchor means when tension is exerted on said belt.

References Cited in the file of this patent
UNITED STATES PATENTS

| | | |
|---|---|---|
| 812,862 | Merrill et al. | Feb. 20, 1906 |
| 853,879 | Heiser | May 14, 1907 |
| 1,551,932 | Carver | Sept. 1, 1925 |
| 1,635,928 | Davis | July 12, 1927 |
| 1,734,039 | Marinsky | Nov. 5, 1929 |
| 1,838,827 | Hart | Dec. 29, 1931 |
| 1,991,633 | Serpico | Feb. 19, 1935 |
| 2,032,591 | Pride | Mar. 3, 1936 |
| 2,409,946 | MacLeod | Oct. 22, 1946 |
| 2,442,266 | Davis | May 25, 1948 |
| 2,790,584 | Rahn et al. | Apr. 30, 1957 |
| 2,804,313 | Gilles | Aug. 27, 1957 |
| 2,841,349 | Charles | July 1, 1958 |